Patented Nov. 29, 1949

2,489,669

UNITED STATES PATENT OFFICE 2,489,669

PREPARATION OF 1-ALKYL-3-BENZOYL-4-HYDROXY-4-PHENYL-PIPERIDINES

John Thomas Plati, Passaic, and Wilhelm Wenner, Montclair, N. J., assignors to Hoffmann-La Roche Inc., Roche Park, Nutley, N. J., a corporation of New Jersey No Drawing. Application January 11, 1947, Serial No. 721,674

7 Claims. (Cl. 260—293)

This invention relates to a new method for preparing 1-alkyl-3-benzoyl - 4 - hydroxy-4-phenyl-piperidines, by which expression, as employed in the specification and claims, we include the compounds in which the phenyl and the benzoyl nuclei are unsubstituted or substituted. Another aspect of the invention relates to new piperidine derivatives and their method of preparation. The new compounds can be more particularly represented by the following formula:

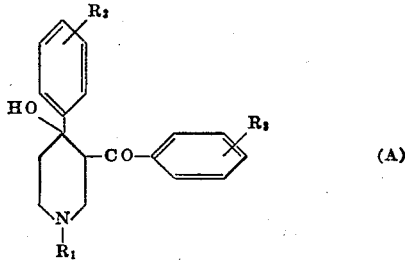

In the above formula, $R_1$ represents an alkyl group such as, for example, methyl, ethyl, propyl, isopropyl, butyl and the like. $R_2$ and $R_3$ stand for hydrogen; an alkyl radical as, for example, methyl, ethyl, propyl, isopropyl and the like; or an alkoxy radical as, for example, methoxy, ethoxy and the like, with the proviso that where $R_2$ and $R_3$ are both H, $R_1$ is an alkyl other than methyl.

Warnat (C. A. 31, 3592 [1937], Festschrift E. Barell, 1936, F. Reinhardt, A. G. Basle, page 255) has reported that the compound 1-methyl-3-benzoyl-4-hydroxy-4-phenyl-piperidine, forms part of the reaction product which is obtained by refluxing in alcohol solution, one molar amount of methylamine hydrochloride with two molar amounts of formaldehyde and two molar amounts of acetophenone. This reaction was first described by Mannich and Heilner (Ber. 55, 356 [1922]), but they reported their reaction product as a mixture of N-(β-benzoylethyl)-methylamine and N-di-(β-benzoylethyl)-methylamine hydrochlorides. Mannich and Hieronimus (Ber. 75, 49 [1942]) later confirmed Warnat's findings that 1-methyl-3-benzoyl- 4 -hydroxy-4-phenyl-piperidine was also present in the reaction mixture.

The above literature accordingly reveals that the condensation of methylamine hydrochloride, formaldehyde and acetophenone yields a reaction product containing three different compounds; namely, (1) N-(β-benzoylethyl)-methylamine, (2) N-di-(β-benzoylethyl)-methylamine, and (3) 1-methyl-3-benzoyl- 4 -hydroxy-4-phenyl-piperidine, all three being present as hydrochlorides.

Mannich and Heilner obtained a 31% yield of (2), Blicke and Burckhalter (J. A. C. S. 64, 453 [1942] employing equimolecular amounts of the reagents, a 34 per cent yield. The last two investigators do not report any presence of (3). Warnat obtained a crude reaction mixture and does not give the yields of the individual components. None of these investigators reports any specific yield of 1-methyl-3-benzoyl-4-hydroxy-4-phenyl-piperidine. It is, however, obvious that the amount of this compound where present must be considerably lower than the total yield of the reaction product since it is present in the reaction product with the other-mentioned compounds, as well as various by-products. Accordingly, for a commercial synthesis of the 1-methyl-3-benzoyl-4-hydroxy - 4 - phenyl-piperidine, the above-mentioned procedures have not been found satisfactory.

We have now found that (a) the crude reaction product of the condensation of methylamine hydrochloride formaldehyde and acetophenone or (b) N-di-β-benzoylethyl)-methylamine hydrochloride can be converted practically quantitatively into the desired 1-methyl-3-benzoyl-4-hydroxy-4-phenyl-piperidine by treating either (a) or (b) with an alkali as, for example, sodium hydroxide, potassium hydroxide, sodium carbonate, potassium carbonate or the like.

This is a surprising and commercially important discovery. From the prior art, such a reaction could not be predicted or foreseen. Warnat, and Mannich and Hieronimus barely reveal the presence of 1-methyl-3-benzoyl-4-hydroxy-4-phenyl-piperidine in the reaction mixture, but present no disclosure that the N-di-(β-benzoylethyl)-methylamine hydrochloride can be converted into the former compound. Blicke and Burckhalter do not disclose the presence of 1-methyl-3-benzoyl-4-hydroxy-4 - phenyl - piperidine in the condensation reaction. The two last-mentioned investigators, primarily concerned with the production of N-(β-benzoylethyl)-methylamine hydrochloride, mention that this compound when treated with two grams of sodium hydroxide in 10 cc. of water at 30° C. results in the formation of N-di-(β-benzoylethyl)-methylamine with the loss of methylamine. Thus, the literature neither reveals nor suggests the possibility of converting either the crude reaction product of the condensation of methylamine hydrochloride, formaldehyde, and acetophenone, or N-di-(β-benzoylethyl)-methylamine hydrochloride into 1-methyl-3-benzoyl-4-hydroxy-4-phenyl-piperidine.

Furthermore, the formation of the piperidine compound from N-di-(β-benzoylethyl)-methylamine hydrochloride could not be expected since steam distillation of the condensation reaction mixture leaves the piperidine derivative present therein unchanged but leads to decomposition of the diketoamine, apparently with the formation of phenyl vinyl ketone (see Warnat, page 261; Mannich and Heilner, page 363 and Blicke and Burckhalter, page 452-3). Thus, from the prior art, one could only expect decomposition of the N-di-(β-benzoylethyl)-methylamine to products of lower molecular weight, and not its conversion into the piperidine compound.

According to our invention, we have found that N-di-(β-benzoylethyl)-methylamine hydrochloride, either in the isolated state or in the reaction product resulting from the condensation of formaldehyde, methylamine hydrochloride and acetophenone, can be easily converted into 1-methyl-3-benzoyl 4-hydroxy-4-phenyl-piperidine when the free base is treated with an alkaline agent such as, for example, sodium hydroxide, potassium hydroxide, sodium carbonate or potassium carbonate, or the like. In practice, our new procedure is preferably carried out by treating the condensation product or the isolated N-di-(β-benzoylethyl)-methylamine hyrochloride with an amount of the alkaline agent in excess of that required to liberate the free base. The length of treatment depends upon the temperature employed, lower temperatures requiring longer periods of time and higher temperatures, shorter periods of time. In general, the procedure comprises adding a solution of the alkaline agent to the isolated diketoamine hydrochloride, or to the condensation product of formaldehyde methylamine hydrochloride and acetophenone, and stirring the mixture in order to insure intimate contact between the water-insoluble base and the solution of the alkali. The conversion is readily recognizable since the liberated base, N-di-(β-benzoylethyl)-methylamine, is an oil and its conversion into the piperidine derivative is accompanied by solidification, the piperidine derivative being crystalline.

The speed of this transformation varies within rather wide limits, depending primarily upon the temperature at which the transformation is carried out and the purity of the starting material. The transformation is accelerated if carried out at elevated temperatures. When operating at higher temperatures up to the boiling point of water, we have found it advantageous on account of the instability of the N-di-(β-benzoylethyl)-methylamine hydrochloride in hot aqueous solution, to add the alkaline reagent immediately to the warm solution of the material and then rapidly to cool to below 40° C. In this manner, a rapid conversion is effected without danger of decomposition of the starting material.

In carrying out the procedure at room temperature, an aqueous solution of N-di-(β-benzoylethyl)-methylamine hydrochloride is stirred at room temperature with dilute sodium hydroxide until the oily base has solidified, which may require up to about twenty-four hours, after which the mixture is filtered. The solid reaction product obtained consists essentially of crude 1-methyl-3-benzoyl-4-hydroxy- 4 -phenyl-piperidine. The product is already of rather high purity, but with recrystallization from methanol it is obtained in pure white crystals of M. P. 136° C.

The yield of the piperidine derivative based on the starting material averages from 70–80 per cent of the theoretical. This is at least twice as high as could possibly be obtained by the procedures described in the literature. By our new method, 1-methyl-3-benzoyl-4-hydroxy-4-phenyl-piperidine thus becomes a readily and easily available material. An especially important feature of our new method is the fact that it requires no fractional crystallizations, which are technically rather difficult and lengthy operations, and had to be carried out by the prior investigators in order to isolate the desired piperidine compound.

While we have described our new process in terms of producing 1-methyl-3-benzoyl-4-hydroxy-4-phenyl-piperidine, it is also effective for the preparation of 1-alkyl-3-benzoyl-4-hydroxy-4-phenyl-piperidines in general, as well as the new substituted piperidine derivatives of Formula A, in particular. Such piperidine compounds can be in general obtained by applying the alkaline treatment to the condensation product of a primary amine, a formaldehyde such as formaldehyde, or formaldehyde-yielding compounds such as formaline, para-formaldehyde, formaldehyde bisulfite, formaldehyde diethyl acetal, and the like, and an acetophenone. As examples of primary amines there can be used ethylamine, propylamine, isopropylamine, butylamine, and the like in the form of their salts. As an example of the acetophenone, there can be employed acetophenone itself, or its ring-substituted derivatives such as alkyl- and alkoxy-acetophenones, as, for example, methyl-acetophenone, ethyl-acetophenone, methoxy-acetophenone, ethoxy-acetophenone and the like. Instead of employing the reaction products, the diketoamines isolated from the reaction products can be employed as starting materials. These diketoamines can be prepared according to the process which forms the subject matter of our patent application Serial No. 721,673, filed January 11, 1947. The diketoamines can be represented by the following general formula:

(B)

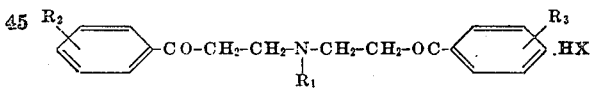

wherein $R_1$ is alkyl and $R_2$ and $R_3$, hydrogen, alkyl or alkoxy; and X is a monovalent acid radical.

In carrying out the condensation reaction, the primary amines are employed in the form of their salts as, for example, salts of hydrochloric or hydrobromic acid and the reagents are preferably employed in the ratio of at least one mole of the amine to at least two moles of the acetophenone and at least two moles of formaldehyde. A diluent or solvent may be employed in the condensation reaction as, for example, ethanol. However, according to our above-mentioned copending application we have found that the yields of the piperidine compound can be considerably increased by carrying out the condensation of the formaldehyde, primary amine and the acetophenone in the absence of any solvent; or in the presence of an excess of the acetophenone, which excess is utilized as a solvent; or by employing a halogenated hydrocarbon as, for example, tetrachloroethane, carbon tetrachloride, chloroform and the like as a diluent or solvent. The tetrachloroethane is especially effective since this diluent permits the removal of the water formed during the reaction, thus materially increasing the yield of the diketoamine as compared with the yield obtained when employing alcohol as a solvent such as in the process described by Mannich and Heilner. Furthermore, the reaction product is almost insoluble in this diluent, thus obviating the recovery of the material by concentration of the mother liquors.

The new piperidine derivatives obtained according to our invention are mostly solids. They are strongly basic, forming salts with mineral acids such as hydrochloric, hydrobromic acids and the like; with organic acids such as oxalic acid and the like. They are slightly soluble in water but soluble in organic solvents. The solubility of the individual compounds in alcohol depends upon the nature of the particular substituents, but is, in general, of such magnitude that alcohol can be used as a recrystallization medium. The new piperidine derivatives are important intermediates for the manufacture of other heterocyclic amines as, for example, those described in our application Serial No. 721,672, filed January 11, 1947, now Patent 2,470,108.

The following examples will serve to illustrate our new method as well as the procedure for the preparation of the new piperidine compounds. The conditions presented in the examples are to be understood as illustrative and not to be regarded as limitations since those skilled in the art will recognize that variations of concentration of base and rate of stirring are feasible, and fall within the scope of our invention.

Example 1

100 grams of N-di-($\beta$-benzoylethyl)-methylamine hydrochloride are added as rapidly as possible with stirring to 1500 cc. of boiling water. Immediately thereafter, 135 cc. of 10 per cent sodium hydroxide are added and the stirred solution is cooled as quickly as possible to 20° C. by means of an ice bath. The solid precipitate formed is filtered off with water and crystallized from 250 cc. of methanol. In this manner, 72 grams of 1-methyl-3-benzoyl-4-hydroxy-4-phenyl-piperidine of M. P. 136° C. are obtained.

Example 2

96 grams of isopropylamine hydrochloride, 240 grams of acetophenone and 60 grams of paraformaldehyde are heated with stirring. At about 80° C., a vigorous reaction occurs. Stirring is discontinued and the temperature rises to about 100–110° C. When the reaction subsides, 400 cc. of ethylacetate are added. The mixture is stirred for about one hour and then filtered. The filtered crystals are suspended in 1000 cc. of water. The mixture is stirred and 200 cc. of 10 per cent sodium hydroxide are added. An oil precipitates which, on stirring for about one hour, solidifies. It is filtered and recrystallized from about 300 cc. of methanol, yielding 1-isopropyl-3-benzoyl-4-hydroxy-4-phenyl-piperidine, M. P. 120–122° C. An additional amount is obtained from the methanol liquors by dilution with water.

Example 3

A mixture of 55 grams of n-butylamine hydrochloride, 120 grams of acetophenone and 30 grams of paraformaldehyde is heated and stirred. At about 80° C., vigorous reaction occurs. The temperature of the mixture rises spontaneously to about 110–120° C. Stirring and heating are discontinued. When the temperature has dropped to about 40° C., 700 cc. of water are added. The mixture is stirred for about one-half hour and then filtered. The crude N-di-($\beta$-benzoylethyl)-n-butylamine hydrochloride thus obtained is crystallized from ethylacetate and yields the pure product with M. P. of 80° C.

80 grams of N-di-($\beta$-benzoylethyl)-n-butylamine hydrochloride is stirred with 350 cc. of water. 300 cc. of 10 per cent sodium hydroxide solution are added. The oily base first obtained becomes a solid on stirring over a period of about two hours. The solid is filtered and is recrystallized from 200 cc. of methanol. 1-n-butyl-3-benzoyl-4-hydroxy-4-phenyl-piperidine of M. P. 97–99° C. is obtained.

Example 4

Instead of using crystallized N-di-($\beta$-benzoylethyl)-n-butylamine hydrochloride as in the preceding example, the preparation of 1-n-butyl-3-benzoyl-4-hydroxy-4-phenyl-piperidine can also be carried out without isolation of the above-mentioned starting material. The procedure is as follows:

A mixture of 55 grams of n-butylamine hydrochloride, 120 grams of acetophenone and 30 grams of paraformaldehyde is heated and stirred. When the temperature reaches about 80° C. a vigorous reaction occurs. Stirring and heating are discontinued and the mixture warms up to about 110–120° C. The temperature soon drops and when it has reached 40° C. a solution of 30 grams of sodium hydroxide in about 750 cc. of water are added with stirring. An oil precipitates which on stirring for about four hours solidifies. It is filtered after standing overnight. The crystals are filtered and recrystallized from methanol, yielding pure 1-n-butyl-3-benzoyl-4-hydroxy-4-phenyl-piperidine of M. P. 97–99° C.

Example 5

A mixture of 125 grams of p-methyl-acetophenone, 31 grams of methylamine hydrochloride and 28 grams of paraformaldehyde is heated with stirring. When the temperature reaches about 80° C. a vigorous reaction occurs. Stirring and heating are discontinued. The temperature rises to about 110–120° C. When the temperature has cooled to about 50° C., about 200 cc. of ethylacetate are added and stirring is resumed. After stirring for about two hours, the mixture is filtered. The crystals are N-di-[$\beta$-p-toluyl-ethyl]-methylamine hydrochloride. 67 grams of this material, 10 grams of sodium hydroxide and 540 cc. of water are stirred vigorously for about an hour. It is then allowed to stand overnight, whereupon the original oily base solidified. It is filtered. The crude 1-methyl-3-p-toluyl-4-hydroxy-4-p-toluyl-piperidine thus obtained is purified by crystallization from methanol. The product has a M. P. of 140–143° C.

Example 6

A mixture of 134 grams of m-methoxy acetophenone, 34 grams of methylamine hydrochloride and 20 grams of paraformaldehyde is heated with stirring. At about 80–90° C., a vigorous reaction occurs. Stirring and heating are discontinued. When the reaction has subsided, the mixture is stirred until room temperature is reached. 600 cc. of water are added and the mixture is extracted twice with ether. The aqueous solution contains N-di-($\beta$-[3-methoxybenzoyl]-ethyl)-methylamine hydrochloride. To it is added 240 cc. of 10 per cent sodium hydroxide. The liberated base is immediately extracted with ether. After repeated washings of the ether solution with water, a saturated solution of oxalic acid in ether is added until no further precipitation appears. The supernatant ether is decanted after the precipitate has settled and the latter is stirred with 400 cc. of hot acetone. After cooling, the crystals are filtered.

122 grams of this oxalate are stirred, using a solution of 20 grams of sodium hydroxide in 1200 cc. of water for three hours. After standing overnight, a solid is obtained. It is filtered and crystallized from 200 cc. of methanol, yielding 1-methyl-3-(3-methoxy-benzoyl)-4-hydroxy-4-(3-methoxyphenyl)-piperidine of M. P. 104–106° C.

Example 7

4900 grams of N-di-(β-benzoylethyl)-methylamine hydrochloride are added at once with stirring to 64 l. of water at 92° C. Immediately afterwards, a solution of 700 grams of sodium hydroxide in 2 l. of water is added. The mixture is then cooled as rapidly as possible as by means of a metal coil through which cold brine is circulated. After standing overnight, the solid precipitate is filtered and washed with water. The yield of crude 1-methyl-3-benzoyl-4-hydroxy-4-phenyl-piperidine is about 4500 grams.

Example 8

A suspension of 1440 grams of N-di-(β-benzoylethyl)-methylamine hydrochloride in 16 l. of water is treated with 320 grams of sodium hydroxide dissolved in 3.2 l. of water. The mixture is stirred at about 20–30° C. until the oily base, which is first obtained solidifies. This occurs after about one hour. The mixture is allowed to stand overnight. It is then filtered and the solid obtained is crude 1-methyl-3-benzoyl-4-hydroxy-4-phenyl-piperidine.

Crystallization from 7 l. of methanol yields 760 grams of pure 1-methyl-3-benzoyl-4-hydroxy-4-phenyl-piperidine, M. P. 135–136° C. as the first crop. Dilution of the mother liquor with equal amount of water gives a second crop which is crystallized from acetone, yielding an additional amount of material, M. P. 135–136° C. from the acetone mother liquors. A third crop of 56 grams of M. P. 134–135° C. is obtained on concentration. The total yield amounts to about 1088 grams (85 per cent of the theoretical).

We claim:

1. The process which comprises subjecting an N-di-(β-benzoylethyl)-alkylamine of the general formula in the form of its hydrohalide:

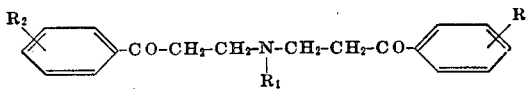

where $R_1$ is alkyl, $R_2$ and $R_3$ are selected from the group consisting of hydrogen, alkyl, and alkoxy, to the action of an aqueous solution of an alkali in excess of that required to liberate the free base, to form a 1-alkyl-3-benzoyl-4-hydroxy-4-phenyl-piperidine.

2. The process which comprises treating N-di-(β-benzoylethyl)-methylamine hydrochloride with an aqueous solution of sodium hydroxide in excess of that required to liberate the free base to form 1-methyl-3-benzoyl-4-hydroxy-4-phenyl-piperidine.

3. The process which comprises treating N-di-(β-benzoylethyl)-isopropylamine hydrochloride with an aqueous solution of sodium hydroxide in excess of that required to liberate the free base, to form 1-isopropyl-3-benzoyl-4-hydroxy-4-phenyl-piperidine.

4. The process which comprises treating N-di-(β-[3-methoxybenzoyl]-ethyl)-methylamine hydrochloride with an aqueous solution of sodium hydroxide in excess of that required to liberate the free base, to form 1-methyl-3-(3-methoxybenzoyl)-4-hydroxy-4-(3-methoxyphenyl)-piperidine.

5. The process which comprises subjecting an N-di-(β-benzoylethyl)-alkylamine of the general formula in the form of its acid addition salts:

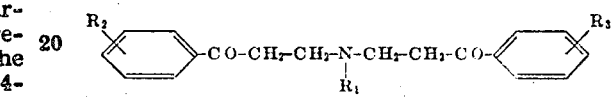

where $R_1$ is alkyl, $R_2$ and $R_3$ are selected from the group consisting of hydrogen, alkyl, and alkoxy, to the action of an aqueous solution of an alkali in excess of that required to liberate the free base, to form a 1-alkyl-3-benzoyl-4-hydroxy-4-phenyl-piperidine.

6. The process which comprises subjecting an N-di-(β-benzoylethyl)-alkylamine of the general formula in the form of its hydrohalide:

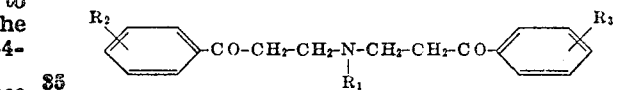

in a hot aqueous solution of an alkali in excess of that required to liberate the free base and cooling the reaction mixture to below 40° C. so as to form a 1-alkyl-3-benzoyl-4-hydroxy-4-phenyl-piperidine, where $R_1$ in the above formula is alkyl, $R_2$ and $R_3$ are selected from the group consisting of hydrogen, alkyl, and alkoxy.

7. The process which comprises treating N-di-(β-benzoylethyl)-methylamine hydrochloride in hot water with sodium hydroxide in excess of that required to liberate the free base and cooling the solution to about 20° C. so as to form 1-methyl-3-benzoyl-4-hydroxy-4-phenyl-piperidine.

JOHN THOMAS PLATI.
WILHELM WENNER.

REFERENCES CITED

The following references are of record in the file of this patent:

Mannich, Chem. Abstr., 1922, vol. 16, p. 2497.
Mannich, Berichte der Deut. Chem. Ges., 1922, vol. 55, pp. 356–365.
Warnat, Chem. Abstr., 1937, vol. 31, p. 2592.
Blicke, Chem. Abstr., 1942, vol. 64, pp. 452–454.
Mannich, Berichte der Deut. Chem. Ges., 1942, vol. 75, pp. 49–64.
Chem. Abstr., 1943, vol. 37, p. 1125.

Certificate of Correction

Patent No. 2,489,669 November 29, 1949

JOHN THOMAS PLATI ET AL.

It is hereby certified that errors appear in the printed specification of the above numbered patent requiring correction as follows:

Column 2, line 23, for "di-$\beta$-" read *di-($\beta$-*; column 3, line 20, for "benzoyl 4" read *benzoyl-4*; column 8, line 61, list of references cited, for "Blicke, Chem. Abstr.," read *Blicke, J. A. C. S.*;

and that the said Letters Patent should be read with these corrections therein that the same may conform to the record of the case in the Patent Office.

Signed and sealed this 28th day of March, A. D. 1950.

[SEAL]

THOMAS F. MURPHY,
*Assistant Commissioner of Patents.*